US012580001B2

(12) United States Patent
Shukla et al.

(10) Patent No.: US 12,580,001 B2
(45) Date of Patent: Mar. 17, 2026

(54) DATA STORAGE DEVICE AND METHOD FOR GESTURE GENERATION AND MANAGEMENT

(71) Applicant: Sandisk Technologies, Inc., Milpitas, CA (US)

(72) Inventors: Arun Kumar Shukla, Bangalore (IN); Ramanathan Muthiah, Bangalore (IN); Snehal Vithal Uphale, Bangalore (IN)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 18/765,593

(22) Filed: Jul. 8, 2024

(65) Prior Publication Data

US 2026/0011345 A1     Jan. 8, 2026

(51) Int. Cl.
*G11B 27/036* (2006.01)
*G06T 11/00* (2006.01)
*G06V 20/62* (2022.01)

(52) U.S. Cl.
CPC ............ *G11B 27/036* (2013.01); *G06T 11/00* (2013.01); *G06V 20/635* (2022.01)

(58) Field of Classification Search
CPC ...... G11B 27/036; G06T 11/00; G06V 20/635
See application file for complete search history.

(56) References Cited

U.S. PATENT DOCUMENTS

| | | | |
|---|---|---|---|
| 5,659,764 A | 8/1997 | Sakiyama et al. | |
| 7,277,858 B1 | 10/2007 | Weaver et al. | |
| 7,774,194 B2 | 8/2010 | Liebermann et al. | |
| 8,566,075 B1 * | 10/2013 | Bruner ............... | H04N 21/6582 704/2 |
| 11,935,170 B1 * | 3/2024 | Jain ........................ | G06V 40/28 |
| 2005/0033578 A1 | 2/2005 | Zuckerman | |
| 2015/0046148 A1 * | 2/2015 | Oh .......................... | G06F 40/58 704/3 |

* cited by examiner

*Primary Examiner* — Mishawn N. Hunter
(74) *Attorney, Agent, or Firm* — Crowell & Moring LLP

(57) ABSTRACT

A data storage device and method are provided for gesture generation and management. In one embodiment, a data storage device is provided comprising a memory and one or more processors. The one or more processors, individually or in combination, are configured to: extract subtitles from a video stored in the memory; generate a gesture video from the subtitles; create a combined video comprising the generated gesture video combined with the video; and store the combined video in the memory. Other embodiments are provided.

19 Claims, 7 Drawing Sheets

Media Container File

DATA STORAGE DEVICE AND METHOD FOR GESTURE GENERATION AND MANAGEMENT

BACKGROUND

Lack of audio comprehension makes it difficult for hearing-impaired people to enjoy audio-video content. Without audio, the media experience may not be immersive enough. Often, subtitles are provided along with the media so that the viewer can understand the speech in the audio. However, non-verbal sounds, such as a ringing phone, are often not communicated using subtitles. Instead of subtitles, a hearing-impaired viewer may prefer to see the textual communication enacted using sign or gesture languages for deaf/mute. Some specialized media content (e.g., certain news broadcasts) show a gesture language video in a picture-in-picture (PIP) window along with the main content.

DETAILED DESCRIPTION

Figures 1A, 1B, 1C:
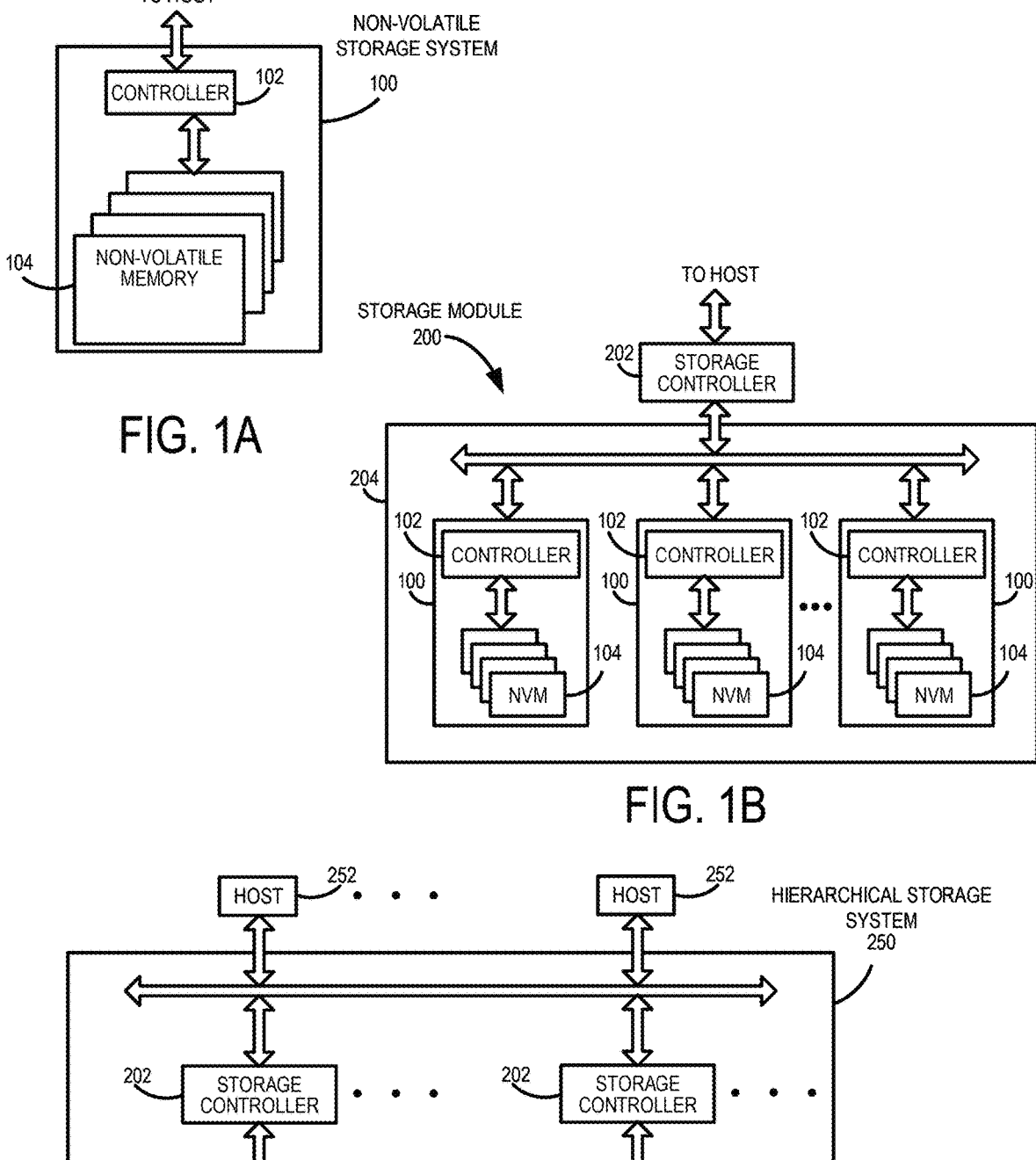
FIG. 1A is a block diagram of a data storage device of an embodiment.
FIG. 1B is a block diagram illustrating a storage module of an embodiment.
FIG. 1C is a block diagram illustrating a hierarchical storage system of an embodiment.

The following embodiments generally relate to a data storage device and method for gesture generation and management. In one embodiment, a data storage device is provided comprising a memory and one or more processors. The one or more processors, individually or in combination, are configured to: extract subtitles from a video stored in the memory; generate a gesture video from the subtitles; create a combined video comprising the generated gesture video combined with the video; and store the combined video in the memory.

In some embodiments, the combined video is created by: caching the generated gesture video in the memory; decoding the generated gesture video and the video in respective frame buffers; and embedding the generated gesture video onto the video.

In some embodiments, the combined video is managed as a data-storage-device-specific file that is abstracted to a host.

In some embodiments, the combined video is exposed to a host and stored in a logical storage space in the memory.

In some embodiments, the one or more processors, individually or in combination, are further configured to trim the gesture video based on a parameter.

In some embodiments, the one or more processors, individually or in combination, are further configured to store the combined video using a flash translation layer biasing scheme.

In some embodiments, the generated gesture video is combined with the video as a picture-in-picture video superimposed on the video.

In some embodiments, the subtitles are extracted from a Moving Picture Experts Group (MPEG) stream.

In some embodiments, the subtitles are extracted from video frames.

In some embodiments, the gestures are generated from the subtitles using an artificial intelligence model.

In some embodiments, the data storage device comprises a network-attached storage server.

In some embodiments, the memory comprises a three-dimensional memory.

In another embodiment, a method is provided that is performed in a data storage device comprising a memory. The method comprises: extracting textual information associated with a video stored in the memory; generating a gesture video from the extracted textual information; and storing the gesture video as a new program to an existing transport stream for the video.

In some embodiments, the gesture video is superimposed on the video as a picture-in-picture video.

In some embodiments, the gestures are generated from the extracted textual information using an artificial intelligence model.

In some embodiments, the transport stream comprises a Moving Picture Experts Group (MPEG) transport stream.

In some embodiments, the data storage device comprises a network-attached storage server.

In some embodiments, the data storage device comprises a content delivery network edge node.

In some embodiments, the data storage device comprises an over-the-top platform.

In another embodiment, a data storage device is provided comprising: a memory; and means for: extracting subtitles from a video stored in the memory; generating a gesture video from the subtitles; and causing the gesture video to be superimposed on the video during playback.

Other embodiments are possible, and each of the embodiments can be used alone or together in combination. Accordingly, various embodiments will now be described with reference to the attached drawings.

EMBODIMENTS

The following embodiments relate to a data storage device (DSD). As used herein, a "data storage device" refers to a non-volatile device that stores data. Examples of DSDs include, but are not limited to, hard disk drives (HDDs), solid state drives (SSDs), tape drives, hybrid drives, etc. Details of example DSDs are provided below.

Examples of data storage devices suitable for use in implementing aspects of these embodiments are shown in FIGS. 1A-1C. It should be noted that these are merely examples and that other implementations can be used. FIG. 1A is a block diagram illustrating the data storage device 100 according to an embodiment. Referring to FIG. 1A, the data storage device 100 in this example includes a controller 102 coupled with a non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. The controller 102 interfaces with a host system and transmits command sequences for read, program, and erase operations to non-volatile memory die 104. Also, as used herein, the phrase "in communication with" or "coupled with" could mean directly in communication/coupled with or indirectly in communication/coupled with through one or more components, which may or may not be shown or described herein. The communication/coupling can be wired or wireless.

Figure 2A:
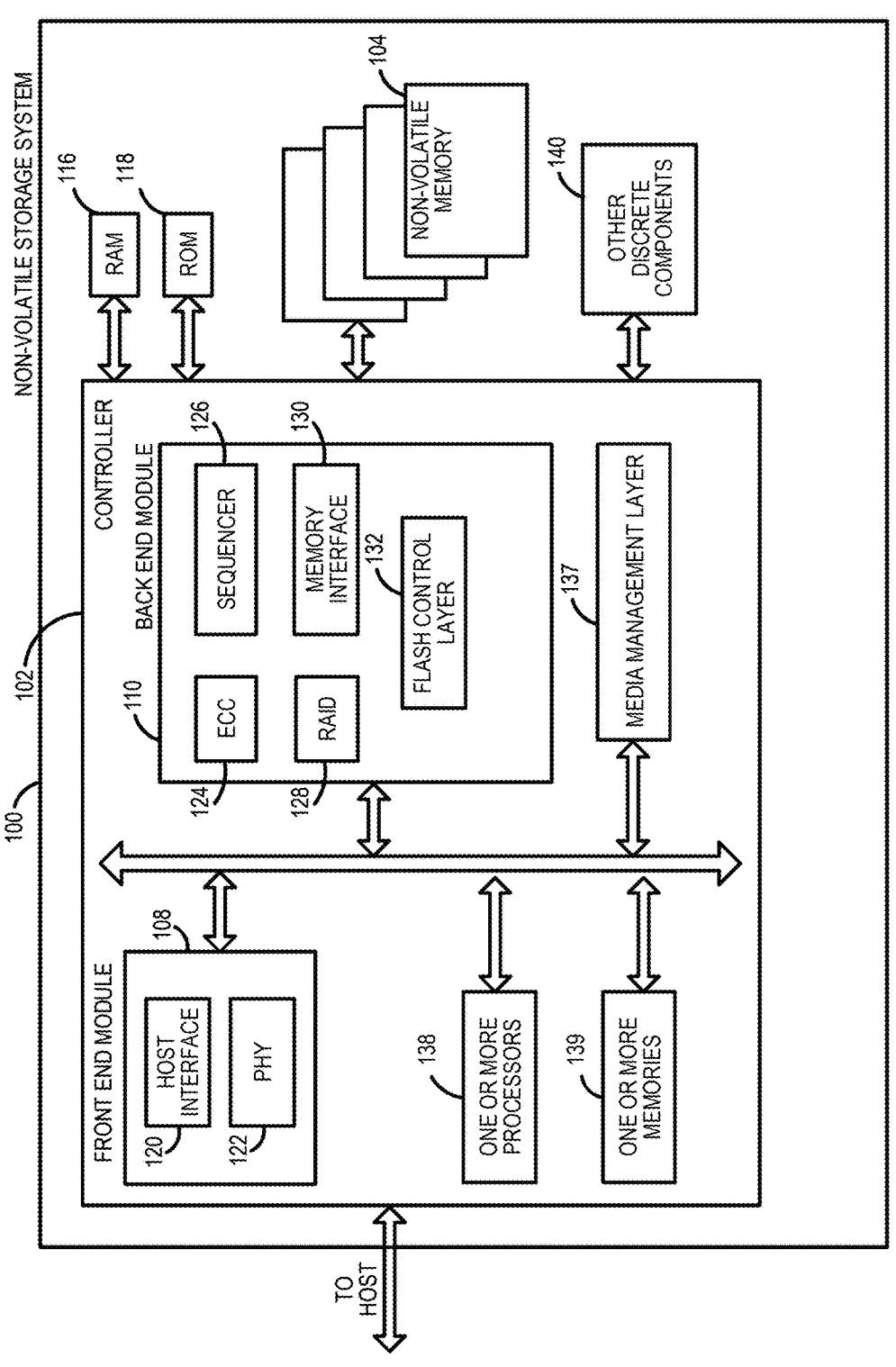
FIG. 2A is a block diagram illustrating components of the controller of the data storage device illustrated in FIG. 1A according to an embodiment.

The controller 102 (which may be a non-volatile memory controller (e.g., a flash, resistive random-access memory (ReRAM), phase-change memory (PCM), or magnetoresistive random-access memory (MRAM) controller)) can include one or more components, individually or in combination, configured to perform certain functions, including, but not limited to, the functions described herein and illustrated in the flow charts. For example, as shown in FIG. 2A, the controller 102 can comprise one or more processors 138 that are, individually or in combination, configured to perform functions, such as, but not limited to the functions described herein and illustrated in the flow charts, by executing computer-readable program code stored in one or more non-transitory memories 139 inside the controller 102 and/or outside the controller 102 (e.g., in random access memory (RAM) 116 or read-only memory (ROM) 118). As another example, the one or more components can include circuitry, such as, but not limited to, logic gates, switches, an application specific integrated circuit (ASIC), a programmable logic controller, and an embedded microcontroller.

In one example embodiment, the non-volatile memory controller 102 is a device that manages data stored on non-volatile memory and communicates with a host, such as a computer or electronic device, with any suitable operating system. The non-volatile memory controller 102 can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware (and/or other metadata used for housekeeping and tracking) to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC) (e.g., dual-level cells, triple-level cells (TLC), quad-level cells (QLC), etc.) or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, the data storage device 100 may be a card-based system, such as a secure digital (SD) or a micro secure digital (micro-SD) card. In an alternate embodiment, the data storage device 100 may be part of an embedded data storage device.

Although, in the example illustrated in FIG. 1A, the data storage device 100 (sometimes referred to herein as a storage module) includes a single channel between controller 102 and non-volatile memory die 104, the subject matter described herein is not limited to having a single memory channel. For example, in some architectures (such as the ones shown in FIGS. 1B and 1C), two, four, eight or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile data storage devices 100. As such, storage module 200 may include a storage controller 202 that interfaces with a host and with data storage device 204, which includes a plurality of data storage devices 100. The interface between storage controller 202 and data storage devices 100 may be a bus interface, such as a serial advanced technology attachment (SATA), peripheral component interconnect express (PCIe) interface, double-data-rate (DDR) interface, or serial attached small scale compute interface (SAS/SCSI). Storage module 200, in one embodiment, may be a solid-state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective data storage device 204. Host systems 252 may access memories within the storage system 250 via a bus interface. In one embodiment, the bus interface may be a Non-Volatile Memory Express (NVMe) or Fibre Channel over Ethernet (FCOE) interface. In one embodiment, the system illustrated in FIG. 1C may be a rack mountable mass storage system that is accessible by multiple host computers, such as would be found in a data center or other location where mass storage is needed.

Referring again to FIG. 2A, the controller 102 in this example also includes a front-end module 108 that interfaces with a host, a back-end module 110 that interfaces with the one or more non-volatile memory die 104, and various other components or modules, such as, but not limited to, a buffer manager/bus controller module that manage buffers in RAM 116 and controls the internal bus arbitration of controller 102. A module can include one or more processors or components, as discussed above. The ROM 118 can store system boot code. Although illustrated in FIG. 2A as located separately from the controller 102, in other embodiments one or both of the RAM 116 and ROM 118 may be located within the controller 102. In yet other embodiments, portions of RAM 116 and ROM 118 may be located both within the controller 102 and outside the controller 102.

Front-end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back-end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. The controller 102 in this example also comprises a media management layer 137 and a flash control layer 132, which controls the overall operation of back-end module 110.

The data storage device 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller are optional components that are not necessary in the controller 102.

Figure 2B:
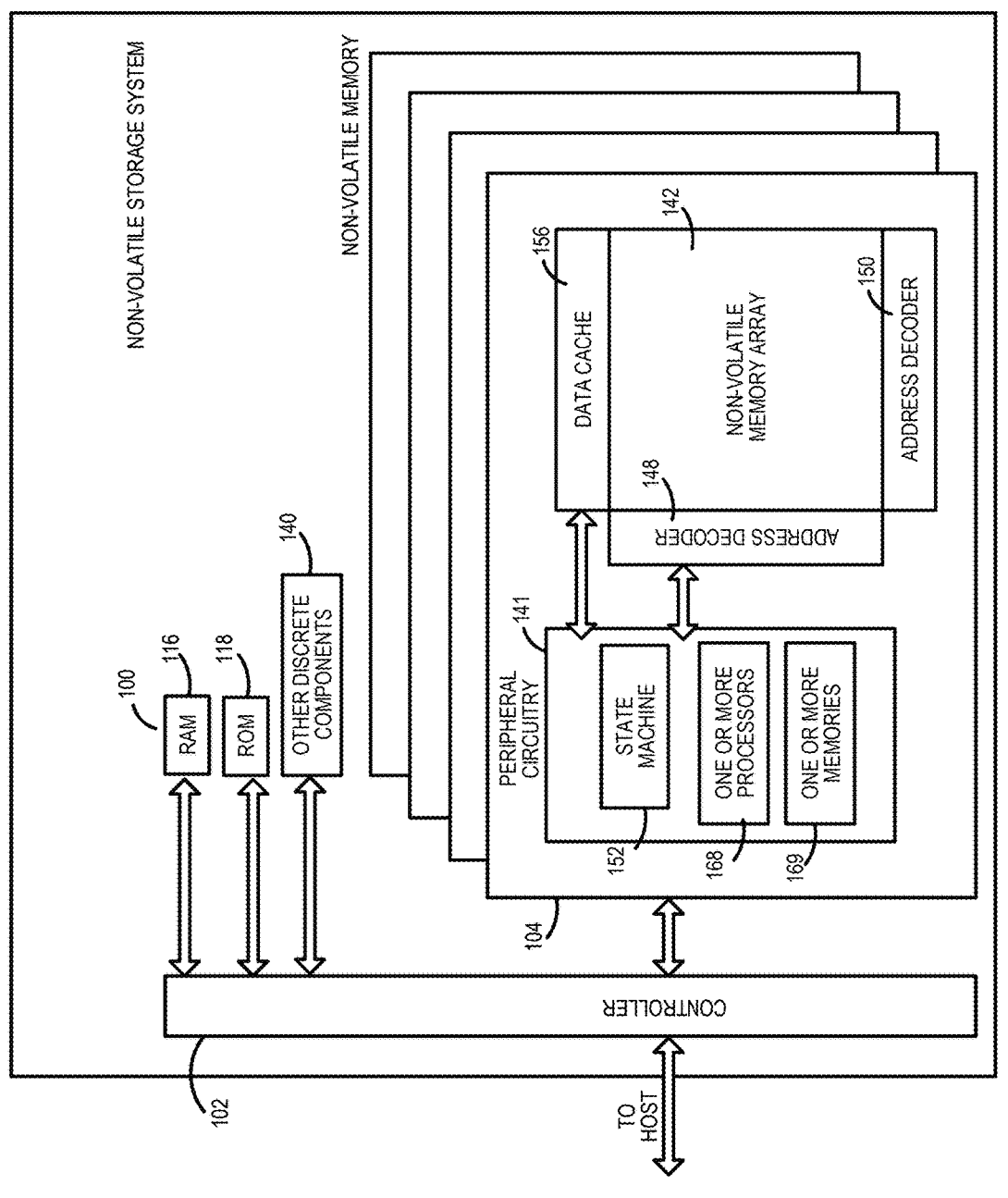
FIG. 2B is a block diagram illustrating components of the data storage device illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two-dimensional and/or three-dimensional configuration. Non-volatile memory die 104 further includes a data cache 156 that caches data and address decoders 148, 150. The peripheral circuitry 141 in this example includes a state machine 152 that provides status information to the controller 102. The peripheral circuitry 141 can also comprise one or more components that are, individually or in combination, configured to perform certain functions, including, but not limited to, the functions described herein and illustrated in the flow charts. For example, as shown in FIG. 2B, the memory die 104 can comprise one or more processors 168 that are, individually or in combination, configured to execute computer-readable program code stored in one or more non-transitory memories 169, stored in the memory array 142, or stored outside the memory die 104. As another example, the one or more components can include circuitry, such as, but not limited to, logic gates, switches, an application specific integrated circuit (ASIC), a programmable logic controller, and an embedded microcontroller.

In addition to or instead of the one or more processors 138 (or, more generally, components) in the controller 102 and the one or more processors 168 (or, more generally, components) in the memory die 104, the data storage device 100 can comprise another set of one or more processors (or, more generally, components). In general, wherever they are located and however many there are, one or more processors (or, more generally, components) in the data storage device 100 can be, individually or in combination, configured to perform various functions, including, but not limited to, the functions described herein and illustrated in the flow charts. For example, the one or more processors (or components) can be in the controller 102, memory device 104, and/or other location in the data storage device 100. Also, different functions can be performed using different processors (or components) or combinations of processors (or components). Further, means for performing a function can be implemented with a controller comprising one or more components (e.g., processors or the other components described above).

Returning again to FIG. 2A, the flash control layer 132 (which will be referred to herein as the flash translation layer (FTL) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may be written in only multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
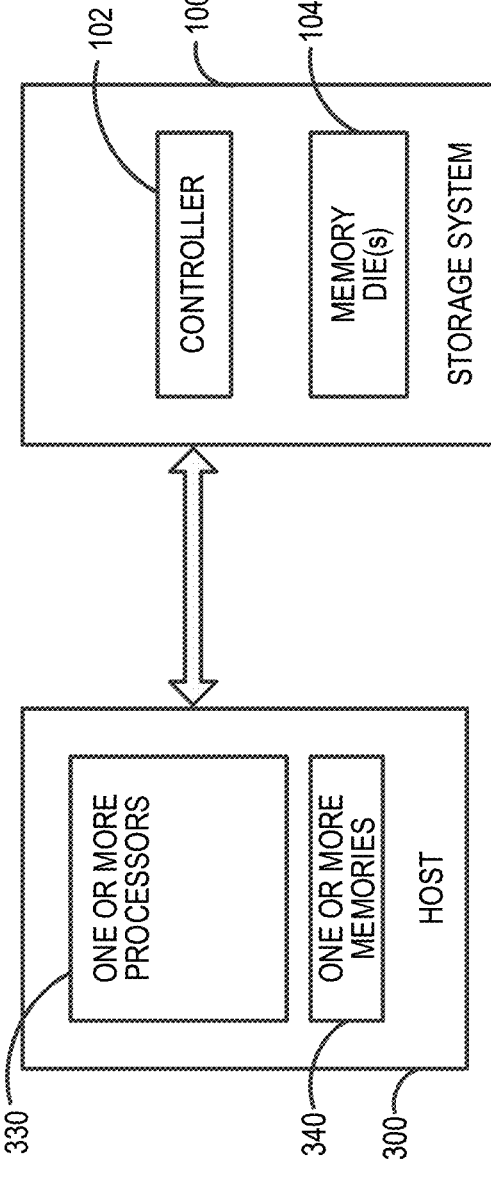
FIG. 3 is a block diagram of a host and a data storage device of an embodiment.

Turning again to the drawings, FIG. 3 is a block diagram of a host 300 and data storage device 100 of an embodiment. The host 300 can take any suitable form, including, but not limited to, a computer, a mobile phone, a tablet, a wearable device, a digital video recorder, a surveillance system, etc. The host 300 in this embodiment (here, a computing device) comprises one or more processors 330 and one or more memories 340. In one embodiment, computer-readable program code stored in the one or more memories 340 configures the one or more processors 330 to perform, individually or in combination, the acts described herein as being performed by the host 300. So, actions performed by the host 300 are sometimes referred to herein as being performed by an application (computer-readable program code) run on the host 300. For example, the host 300 can be configured to send data (e.g., initially stored in the host's memory 340) to the data storage device 100 for storage in the data storage device's memory 104.

As noted above, lack of audio comprehension makes it difficult for hearing-impaired people to enjoy audio-video content. Without audio, the media experience may not be immersive enough. Often, subtitles (e.g., closed caption) are provided along with the media so that the viewer can understand the speech in the audio. However, non-verbal sounds, such as a ringing phone, are often not communicated using subtitles. Instead of subtitles, a hearing-impaired viewer may prefer to see the textual communication enacted using sign or gesture languages for deaf/mute.

Some specialized media content (e.g., certain news broadcasts) show a gesture language video in a picture-in-picture (PIP) window along with the main content. However, the PIP window consumes screen space and can distract a viewer without an impairment from the main video. Due to this reason, that viewer may shun away from this type of specialized content. Creation of the sign language video also requires specialized experts and extra effort. These problems can add prohibitive costs for content producers.

In addition to subtitles/closed captions (which are added to the media, can be in different languages, and can be switched on/off by the use) and hearing-impaired subtitles (which describes non-verbal sounds in textual format), an assisted-listening device can be used to allow a hearing-impaired person to enjoy audio-video media. These devices directly play the sound in the person's ear, thus cutting-out ambient noise and making the sound easier to understand. These devices are useful for people who are facing hearing loss but do not have complete hearing loss.

The following embodiments provide a data storage device and method for gesture generation and management, which can allow a hearing-impaired person to enjoy audio-video media. The data storage device can take any suitable form, such as the examples described above, as well as others, such as, but not limited to a network-attached data storage device (NAS) (which is sometimes referred to herein as a "storage server") and a content delivery network (CDN) edge node. It should be understood that these are merely examples and that other types of data storage devices can be used. As such, a particular type of data storage device should not be read into the claims unless expressly recited therein.

In general, in these embodiments, gesture (e.g., sign language) video is automatically generated by the data storage device 100 from audio-video media content that is in regular format. The gesture video can be generated, for example, using a generative artificial intelligence (AI) model. The gesture video can be shown to the user in a picture-in-picture (PIP) window on the user's display device, in another location on the user's display device, on a secondary display device, etc. In one embodiment, the PIP window can be turned on/off by sending a request to the data storage device 100. For example, the hearing-impaired viewer can request the media content with gesture video, and the controller 102 of the data storage device 100 can generate the gesture video using the subtitle textual information available in the media. In this way, a viewer can enable and disable the gesture video PIP window, with the data storage device 100 providing a mechanism to enable/disable the operation as per the viewer's requirement. For example, if the user accesses the media using a representational state transfer (REST) application program interface (API) or a hypertext transfer protocol (http), the operation may be controlled using an API parameter.

It should be noted that the general concept of subtitle extraction from a MPEG stream is known, as well as sign language translation systems that generate gestures from the text. However, in these embodiments, the generation and management of gestures are performed in the data storage device 100, which increases efficiency of the overall ecosystem and corresponding management based on an end-customer's needs. Also, the user of data-storage-device-specific data storage techniques provide several benefits, as will be explained below.

In one embodiment, the controller 102 of the data storage device 100 (e.g., a storage server system, NAS, a data storage device used in cloud or over-the-top (OTT) system, etc.) has a model that extracts the text from the subtitles in a Moving Picture Experts Group (MPEG) stream or from video frames in the memory 104, uses a model to generate a gesture (e.g., sign language) from the extracted text, adds the generated gesture as another video program to the transport stream (TS) in a PIP format (e.g., gesture picture in an actual video picture), manages the new data as device-specific data or as new logical data transparent to the host 300, and updates the configuration to play the new transport stream with PIP during video playback based on a host requirement. This data storage device 100 enables gesture playback alongside video playback (in PIP form) as customized by the end user. In this example, a gesture is a sequence of images that are played back as secondary video in PIP form.

An artificial intelligence (AI) model can be used to generate gestures from subtitle information. A generative AI model for video can requires a relatively-large amount of computing resources for training and inference. The computing resources for inference may be a concern if the model is housed in storage servers of varying capacity. The inference time can be important since audio/video presentation is typically time constrained. The generative AI model can be developed in-house, or an open-source model can be modified to fit the requirements This model can be trained by providing a large dataset of pairs of input text and corresponding video. The input video can be low resolution since the output video is also not required to be of high resolution. This can reduce the number of parameters in the model and help reduce the inference time. If subtitle information is provided with a presentation timestamp, the inference time can be within the presentation to enable on-the-fly output video generation. Also, the generated video can fit within the given timestamp.

The new gesture program can be managed by the controller 102 of the data storage device 100 as another piece of logical data, which can be device-specific data and/or transparent to host. The controller 102 of the data storage device 100 can manage additional metadata and control data based on the requirements to support the system.

The new program can be generated on the fly in some cases when an end-user makes a request, or the new program can be generated during idle time of the data storage device 100 and stored. These embodiments can be supported by a graphical user interface (GUI) where the end-user can choose an option to have gesture PIP in the stored MPEG stream.

As mentioned above, many different types of implementations can be used. In one example implementation, the controller 102 of the data storage device 100 embeds (superimposes) the PIP video in the main video. In this example, the controller 102 retrieves the data from the memory 104, extracts the subtitle, generates gesture video, and temporarily caches the gesture video in the memory 104, such as in a single-level cell (SLC) buffer. The controller 102 can decode both videos into frame buffers and then superimpose the gesture video on the original video to generate a combined video. Finally, the controller 102 can store the combined video as a supporting program in the memory 104. The new file can be managed as a device-specific file that is abstracted from the host 300 and used for playback when a special playback for impairment is requested. Alternatively, the new file can be exposed to the host 300 and stored in a new logical storage space that is marked in the file system.

The controller 102 can also employ automatic NAND trimming to elapse the new content based on time or other parameters. The controller 102 can additionally employ flash translation layer (FTL) biasing schemes, such as protection and endurance, for the newly-created logical data based on host 300 and the application requirements.

Figure 4:
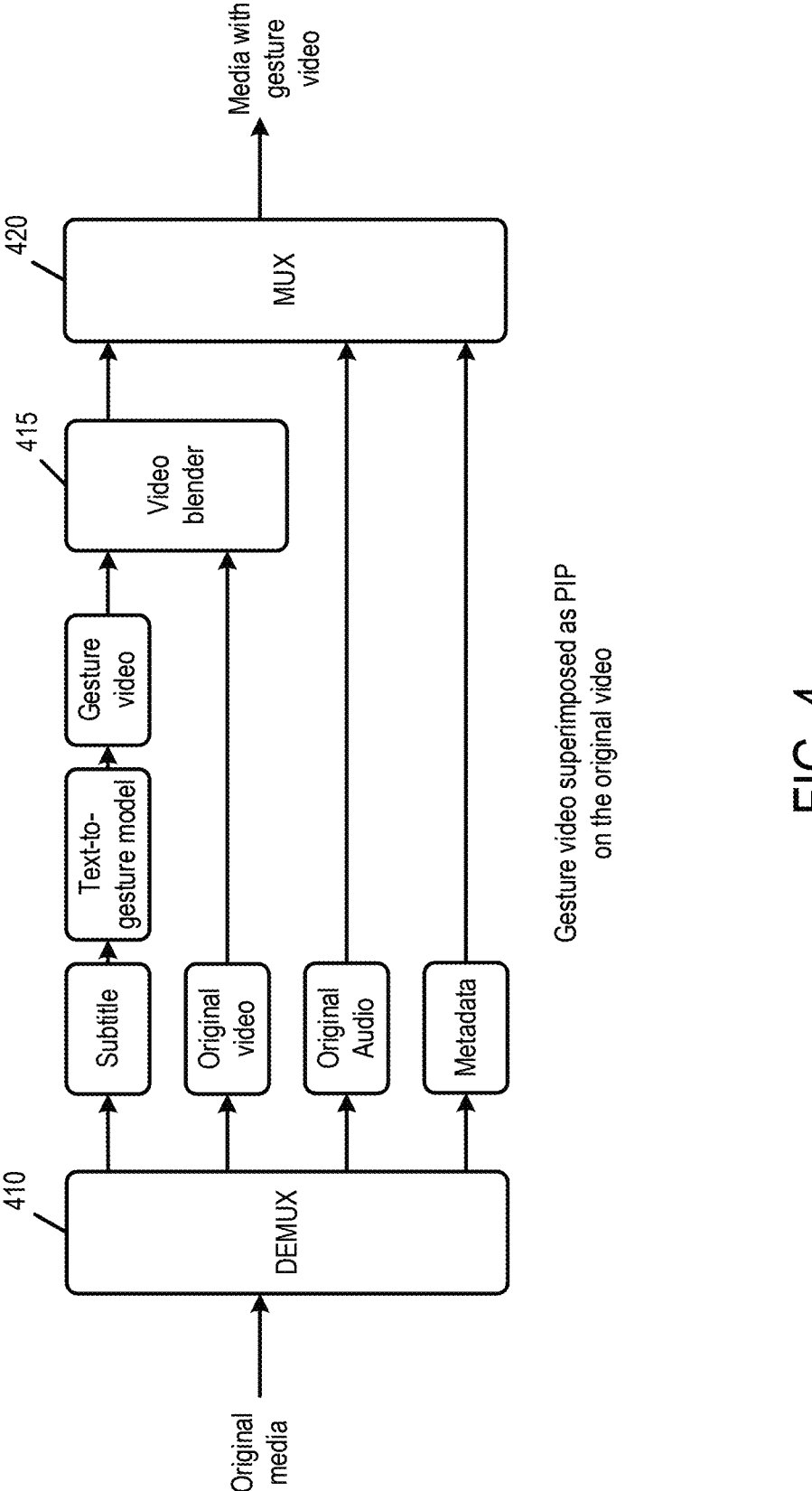
FIG. 4 is a block diagram of a system of an embodiment for superimposing gesture video as a picture-in-picture of an original video.

FIG. 4 is a block diagram of some additional components of the controller 102 of the data storage device 100; namely, a demultiplexor 410, a video blender 415, and a multiplexor 420. As shown in FIG. 4, the demultiplexor 410 produces subtitles, original video, original audio, and metatdata from an original media file. The controller 102 uses a text-to-gesture model (now known or later developed) to generate a gesture video from the subtitles. The video blender 415 superimposes the gesture video onto the original video (e.g., as a picture-in-picture video or otherwise). Finally, the multiplexor 420 combines the output of the video blender 415, the original audio, and the metadata and outputs media with the gesture video.

So, in this embodiment, the gesture video is embedded in the main video as a small PIP window. To achieve this, the processing application on the controller 102 can have the capability of decoding the video into video frames. If the content is encrypted, the controller 102 can also have decryption capability along with associated digital rights management (DRM) or other security keys. To generate the PIP video, the controller 102 can decode both videos into frame buffers and then superimpose the gesture video on the original video to generate a combined video. In one implementation, this is performed in hardware, although, in other implementations, software is used.

In another example implementation, the controller 102 of the data storage device 100 manages a separate video track. In this example, the controller 102 retrieves the data from the memory 104, extracts the subtitle, generates gesture video, and manages and stores it as a separate gesture video program in the memory 104 (e.g., in an SLC buffer). Further, the controller 102 adds this video program as a new program to the existing MPEG transport stream (TS), wherein the current stream itself is modified. Additionally, the controller 102 can manage two copies: one MPEG stream that is actual, and another MPEG stream that has the additional gesture program embedded in it. The controller 102 can additionally employ FTL-biasing schemes, such as protection and endurance, for the generated MPEG data that has a new gesture program embedded in it. MPEG parameters can be modified to accommodate the new program, per the MPEG specification. The media player (e.g., in the host 300, outside of the data storage device 100) can be responsible for decoding both video programs (the actual and the gesture) from the stream and play them in sync. By proper user settings, backward compatibility can be enabled when the playback system ignores the decode and synchronization of the gesture program when not required although is part of the MPEG TS.

Figure 5:
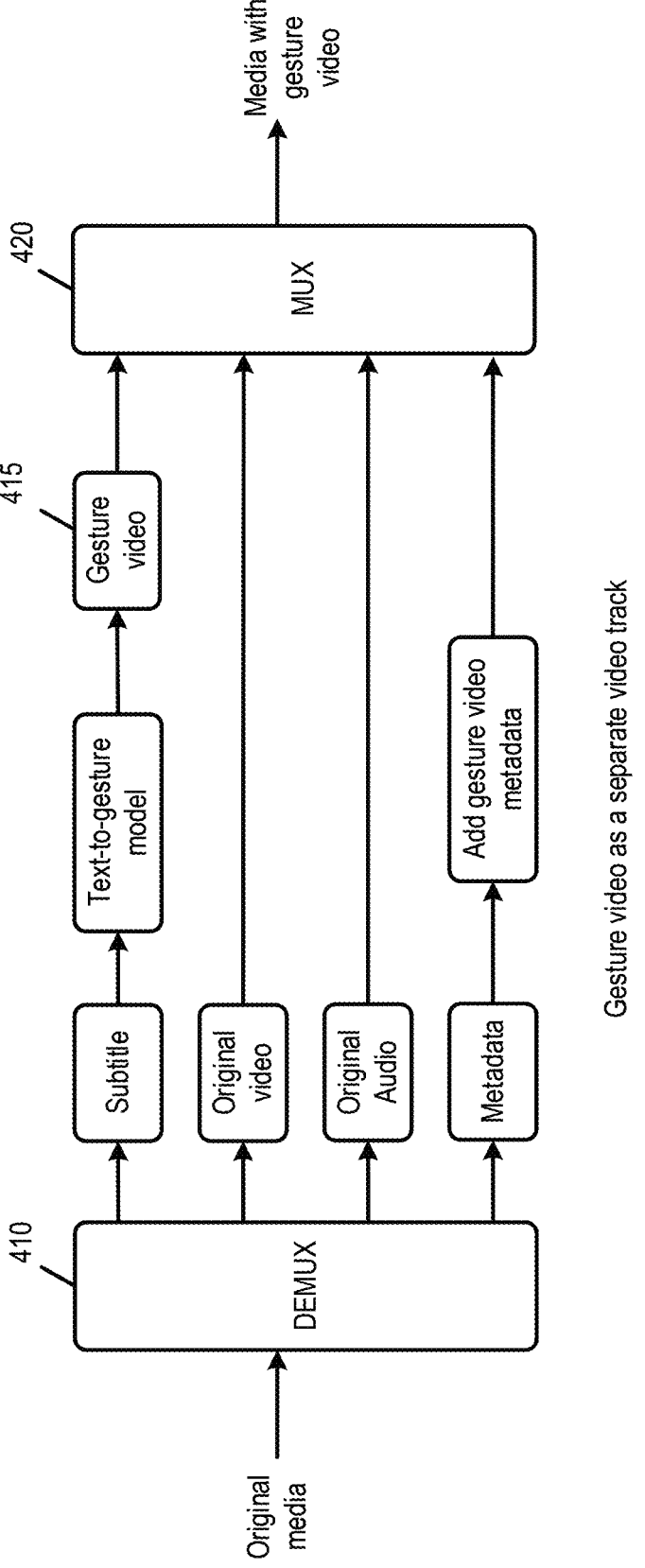
FIG. 5 is a block diagram of a system of an embodiment for providing gesture video as a video track separate from an original video.

FIG. 5 is a block diagram that illustrates this embodiment. As shown in FIG. 5, the demultiplexor 410 produces subtitles, original video, original audio, and metatdata from an original media file. The controller 102 uses a text-to-gesture model (now known or later developed) to generate a gesture video from the subtitle. The controller 102 also generates gesture video metadata. The multiplexor 420 combines the gesture video, original video, original audio, and the newly-created metadata and outputs media with the gesture video. The generated gesture video metadata can be used by the host 300 to playback the outputted media file.

So, in this embodiment, a separate video track can be created with the output video. This track can be included in the media stream that the data storage device 100 provides to the client. In MPEG-based media, a program map table can be modified to reflect the new video track. The presentation and decoding timestamps of the video frames in the gesture video can be synchronized with the original video. The media player in the client device can have the capability to display the PIP video along with the original video. The benefit of this approach is that the data storage device 100 need not have decryption capability for the original video if it is encrypted.

Many alternatives can be used with these embodiments. For example, one alternate embodiment is extrapolated in over-the-top (OTT) platforms. In this alternative, in response to an end-customer request, the controller 102 of the data storage device 100 can perform one of the methods described above (or other methods) to dynamically add PIP support with gesture generation to the legacy content when the controller 102 determines that such video playback is required. Additionally, the option of dynamically choosing the type of gestures (among a plurality of text-to-gesture designs) can be accomplished based on end user ratings and preference list. A method triggered in the cloud or in an edge system can be used to accomplish the task. In some cases, the controller 102 of the data storage device 100 can also convert the subtitle to a preferred audio (e.g., an audio language that is otherwise not part of the stream) and add an additional audio program to the stream.

Figure 6:
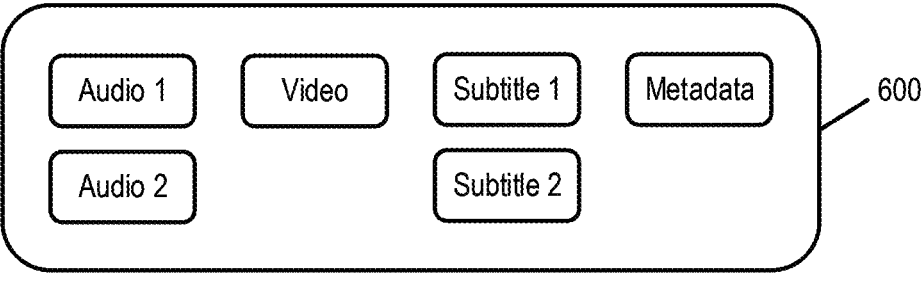
FIG. 6 is a block diagram of a media container file of an embodiment.

FIG. 6 is a block diagram of an example media container file of an embodiment. There are multiple methods of embedding the subtitles (e.g., closed captions) in media content. For example, ".SRT files" are text files that are bundled along with the main audio-video (AV) content and can contain time stamps and speech transcripts. As another example, the text can be part of a data track, which is a way of embedding the subtitles in the media package, as specified by a media container format. For example, in MPEG-based formats, the subtitles are transmitted with their own data streams. These streams can be identified by reading the program map table of the viewed program. The subtitles may be present in an American Standard Code for Information Interchange (ASCII) or Unicode encoding, or they may be present as a bitmap in the subtitle data stream. A subtitle in the bitmap format can be converted to a text format using a pixel-to-text conversion method. If subtitle information is not present, then a speech-to-text converter can be used to generate subtitles. The appropriate audio track in the media can be selected using audio language descriptors in the media.

There are several advantages associated with these embodiments. For example, these embodiments can provide a rich and improved media experience to a hearing-impaired viewer. Also, because the gesture video is generated on the fly, these embodiments can reduce the requirement of extra storage space and avoid the cost associated with generating the gestures manually. Further, these embodiments can help a significant portion of the disadvantaged population and help an organization fulfill its corporate social responsibility.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two-dimensional memory structure or a three-dimensional memory structure.

In a two-dimensional memory structure, the semiconductor memory elements are arranged in a single plane or a single memory device level. Typically, in a two-dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three-dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three-dimensional memory structure may be vertically arranged as a stack of multiple two-dimensional memory device levels. As another non-limiting example, a three-dimensional memory array may be arranged as multiple vertical columns (e.g., columns extending substantially perpendicular to the major surface of the substrate, i.e., in the y direction) with each column having multiple memory elements in each column. The columns may be arranged in a two-dimensional configuration, e.g., in an x-z plane, resulting in a three-dimensional arrangement of memory elements with elements on multiple vertically stacked memory planes. Other configurations of memory elements in three dimensions can also constitute a three-dimensional memory array.

By way of non-limiting example, in a three-dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three-dimensional configurations can be envisioned wherein some NAND strings contain memory elements in a single memory level while other strings contain memory elements which span through multiple memory levels. Three-dimensional memory arrays may also be designed in a NOR configuration and in a ReRAM configuration.

Typically, in a monolithic three-dimensional memory array, one or more memory device levels are formed above a single substrate. Optionally, the monolithic three-dimensional memory array may also have one or more memory layers at least partially within the single substrate. As a non-limiting example, the substrate may include a semiconductor such as silicon. In a monolithic three-dimensional array, the layers constituting each memory device level of the array are typically formed on the layers of the underlying memory device levels of the array. However, layers of adjacent memory device levels of a monolithic three-dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three-dimensional memory arrays. Further, multiple two-dimensional memory arrays or three-dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three-dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A data storage device comprising:

a memory; and one or more processors, individually or in combination, configured to:

extract subtitles from a video stored in the memory;

generate a gesture video from the subtitles;

create a combined video comprising the generated gesture video combined with the video, wherein the combined video is created by:

caching the generated gesture video in the memory;

decoding the generated gesture video and the video in respective frame buffers; and embedding the generated gesture video onto the video; and store the combined video in the memory.

2. The data storage device of claim 1, wherein the combined video is managed as a data-storage-device-specific file that is abstracted to a host.

3. The data storage device of claim 1, wherein the combined video is exposed to a host and stored in a logical storage space in the memory.

4. The data storage device of claim 1, wherein the one or more processors, individually or in combination, are further configured to trim the gesture video based on a parameter.

5. The data storage device of claim 1, wherein the one or more processors, individually or in combination, are further configured to store the combined video using a flash translation layer biasing scheme.

6. The data storage device of claim 1, wherein the generated gesture video is combined with the video as a picture-in-picture video superimposed on the video.

7. The data storage device of claim 1, wherein the subtitles are extracted from a Moving Picture Experts Group (MPEG) stream.

8. The data storage device of claim 1, wherein the subtitles are extracted from video frames.

9. The data storage device of claim 1, wherein the gestures are generated from the subtitles using an artificial intelligence model.

10. The data storage device of claim 1, wherein the data storage device comprises a network-attached storage server.

11. The data storage device of claim 1, wherein the memory comprises a three-dimensional memory.

12. A method comprising:

performing in a data storage device comprising a memory:

extracting textual information associated with a video stored in the memory;

generating a gesture video from the extracted textual information; and storing the gesture video as a new program to an existing transport stream for the video using a flash translation layer biasing scheme.

13. The method of claim 12, wherein the gesture video is superimposed on the video as a picture-in-picture video.

14. The method of claim 12, wherein the gestures are generated from the extracted textual information using an artificial intelligence model.

15. The method of claim 12, wherein the transport stream comprises a Moving Picture Experts Group (MPEG) transport stream.

16. The method of claim 12 wherein the data storage device comprises a network-attached storage server.

17. The method of claim 12, wherein the data storage device comprises a content delivery network edge node.

18. The method of claim 12, wherein the data storage device comprises an over-the-top platform.

19. A data storage device comprising:

a memory; and means for:

extracting subtitles from a video stored in the memory;

generating a gesture video from the subtitles;

caching the generated gesture video in the memory; and causing the gesture video to be superimposed on the video during playback by:

decoding the generated gesture video and the video in respective frame buffers; and embedding the generated gesture video onto the video.

* * * * *